J. GLANZ.
PLUG INSERTING DEVICE.
APPLICATION FILED OCT. 6, 1909.

1,000,168.

Patented Aug. 8, 1911.

Witnesses:
Harry B. Hebig
M. Hamilton

Joseph Glanz Inventor
By his Attorney
James Hamilton

UNITED STATES PATENT OFFICE.

JOSEPH GLANZ, OF HARTFORD, CONNECTICUT.

PLUG-INSERTING DEVICE.

1,000,168. Specification of Letters Patent. Patented Aug. 8, 1911.

Application filed October 6, 1909. Serial No. 521,293.

*To all whom it may concern:*

Be it known that I, JOSEPH GLANZ, a citizen of the United States, residing at Hartford, in the county of Hartford and State of Connecticut, have invented certain new and useful Improvements in Plug-Inserting Devices, of which the following is a specification, reference being had to the accompanying drawings.

My invention relates to improvements in tools for inserting puncture-plugs in pneumatic tires; and an object of my invention is to provide a tool of the character described which will be simple in construction, comparatively cheap in manufacture and most efficient and handy in use.

Figure 1:
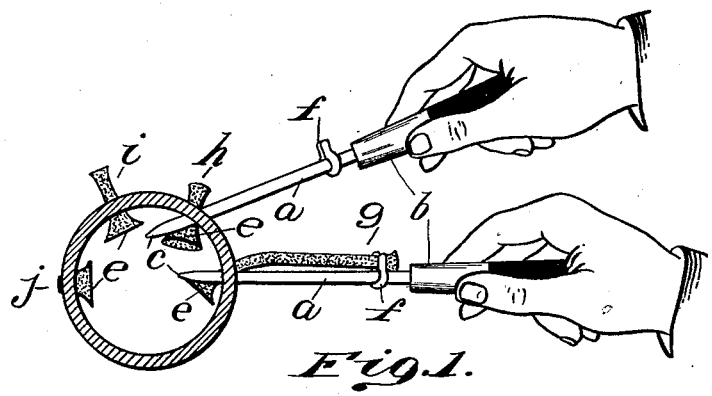
Figure 2:
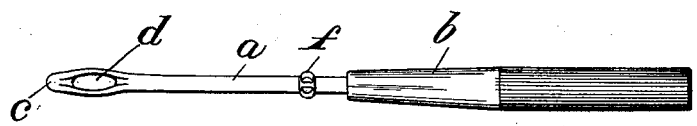
Figure 3:
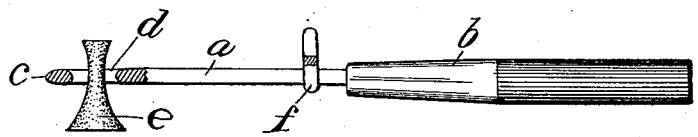

In the drawings illustrating the principle of my invention and the best mode now known to me of applying that principle, Figure 1 is a perspective view showing my new tool in use and illustrating the several steps in the repair of a puncture in a pneumatic tire or air tube; Fig. 2 is a plan of my new tool; and Fig. 3 is an elevation of the same, partly in section.

Upon the shank end of the body portion $a$ of my new tool is fitted a handle $b$. The working end or plug-carrying end $c$ of my new tool is formed with a hole or eye $d$ through which may be passed the smaller end of the puncture-plug $e$. The base or larger end of the latter is so large that it cannot pass through the hole $d$. Upon the body portion $a$ is mounted a forked holder or catch $f$. As is shown in Fig. 2, the interval or space between the walls or parts of the forked holder is open to permit the ready insertion and release of the smaller end of the repair-plug.

In the use of the instrument or tool, the smaller end of the puncture-plug $e$ is passed through the hole or eye $d$ and is then pulled or stretched, until it extends to the forked holder $f$, in which it is caught, as shown in Fig. 1 at $g$. The walls of the puncture or hole in the tire and the base of the puncture-plug are covered with cement and the base end of the plug is forced through the puncture or hole into the tire or air tube $k$, as shown in Fig. 1. The small end of the plug is then released from the forked holder $f$, as is shown at $h$ in Fig. 1. The tool is then withdrawn from the tire, the small end of the puncture-plug $e$ passing readily through the eye $d$ in the tool. This leaves the puncture-plug as shown at $i$ in Fig. 1. Cement is now inserted around the plug $e$ and the tube is inflated. The small end of the plug is next cut off level with the tire as shown at $j$ in Fig. 1.

I claim:

A tool for inserting in the puncture of a tire a repair plug comprising a large head at one end, a small head at the other end, and a plug shank connecting the said heads, and said tool having an eye suitable for admitting the said small end, and holding the said shank, an end adjacent the said eye suitable for bearing against the said large head when the plug shank is so held in the eye, a tool shank extending from the said eye and provided with an open fork, the arms of the said fork spaced so as to admit the said plug shank and to hold back the said small head, and the said fork spaced from the said eye suitably for permitting the said plug to be positively and resiliently held by the said tool with the large head thereof engaged with the said eye and the small head engaged with the said fork.

In testimony whereof I have hereunto set my hand at said Hartford this 4th day of October, 1909.

JOSEPH GLANZ.

Witnesses:
 JAMES E. HAMILTON,
 KATHARINE R. KELLY.

Copies of this patent may be obtained for five cents each, by addressing the "Commissioner of Patents, Washington, D. C."